United States Patent [19]
Manoogian et al.

[11] 3,882,897
[45] May 13, 1975

[54] MIXING VALVE

[75] Inventors: Alex Manoogian, Groose Pointe Farms; Eric V. Pullen, Southfield, both of Mich.

[73] Assignee: Masco Corporation, Taylor, Michigan

[22] Filed: Aug. 13, 1973

[21] Appl. No.: 387,786

[52] U.S. Cl............................. 137/625.4; 137/636.3
[51] Int. Cl............................................. F16k 11/06
[58] Field of Search....... 137/625.17, 625.4, 625.41, 137/636.3

[56] References Cited
UNITED STATES PATENTS
3,372,710  3/1968  Miller .............................. 137/636.3

*Primary Examiner*—Henry T. Klinksiek
*Attorney, Agent, or Firm*—Whittemore, Hulbert & Belknap

[57] ABSTRACT

A hot and cold water mixing valve comprising a valve body having a mixing chamber therein and hot and cold water inlet ports opening into one wall of the mixing chamber, and a valve member controlled by a single operating handle and having a surface thereof movable over said wall of the mixing chamber. The valve is characterized by a unique port configuration to communicate the hot and cold water inlet ports with the mixing chamber, the ports in the valve member being dimensioned and so related to the hot and cold water inlet ports as to permit rotation of the control handle through about 180° to control the temperature of the water discharged from the valve. The port configuration is such that upon rotation of the valve member from full cold to full hot position there is an initial relatively rapid increase in temperature from cold to warm, then a very gradual adjustment in temperature throughout the comfort range, which is generally considered to be from 90° F., to 110° F., followed by a relatively rapid increase in temperature to the full hot position.

19 Claims, 11 Drawing Figures

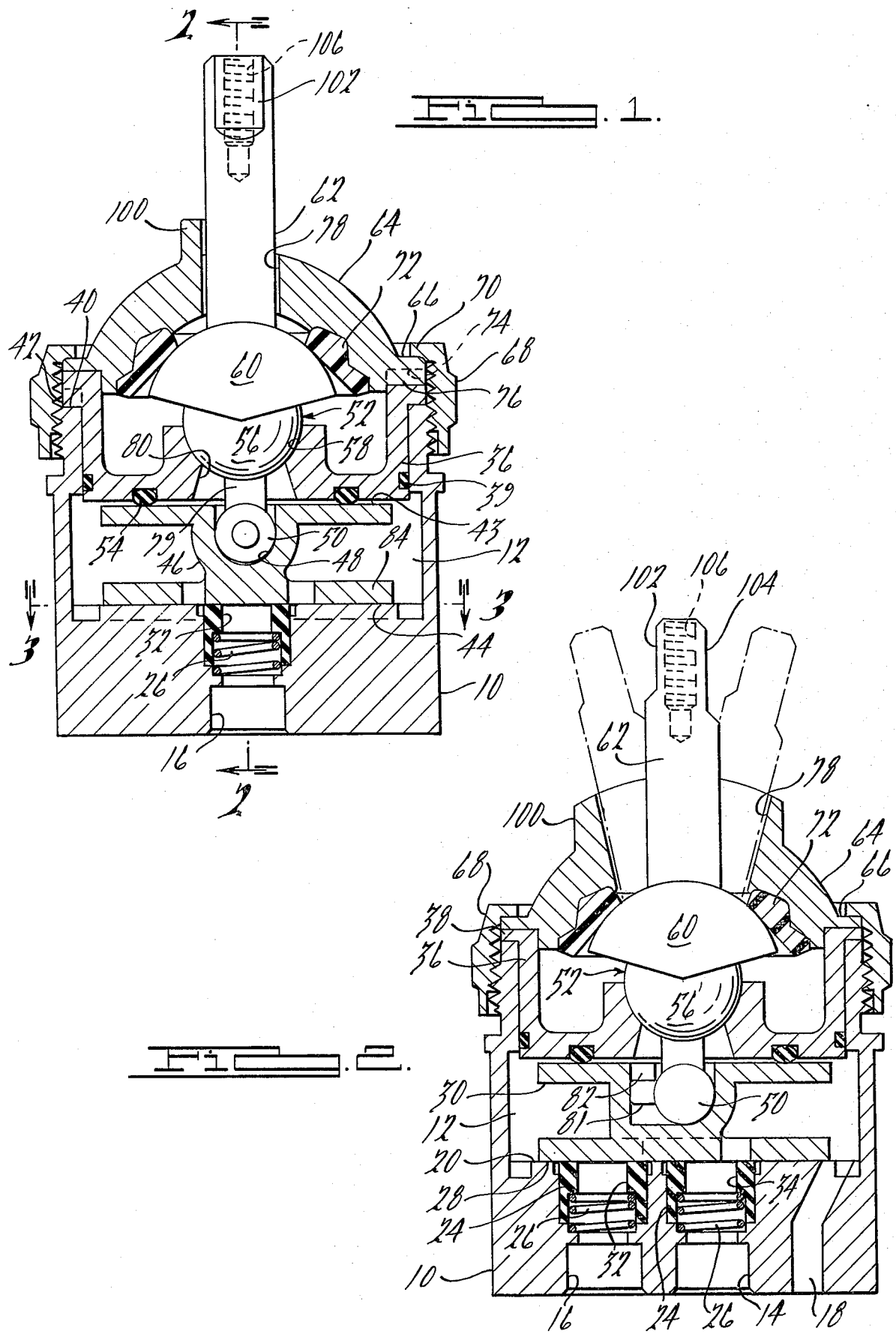

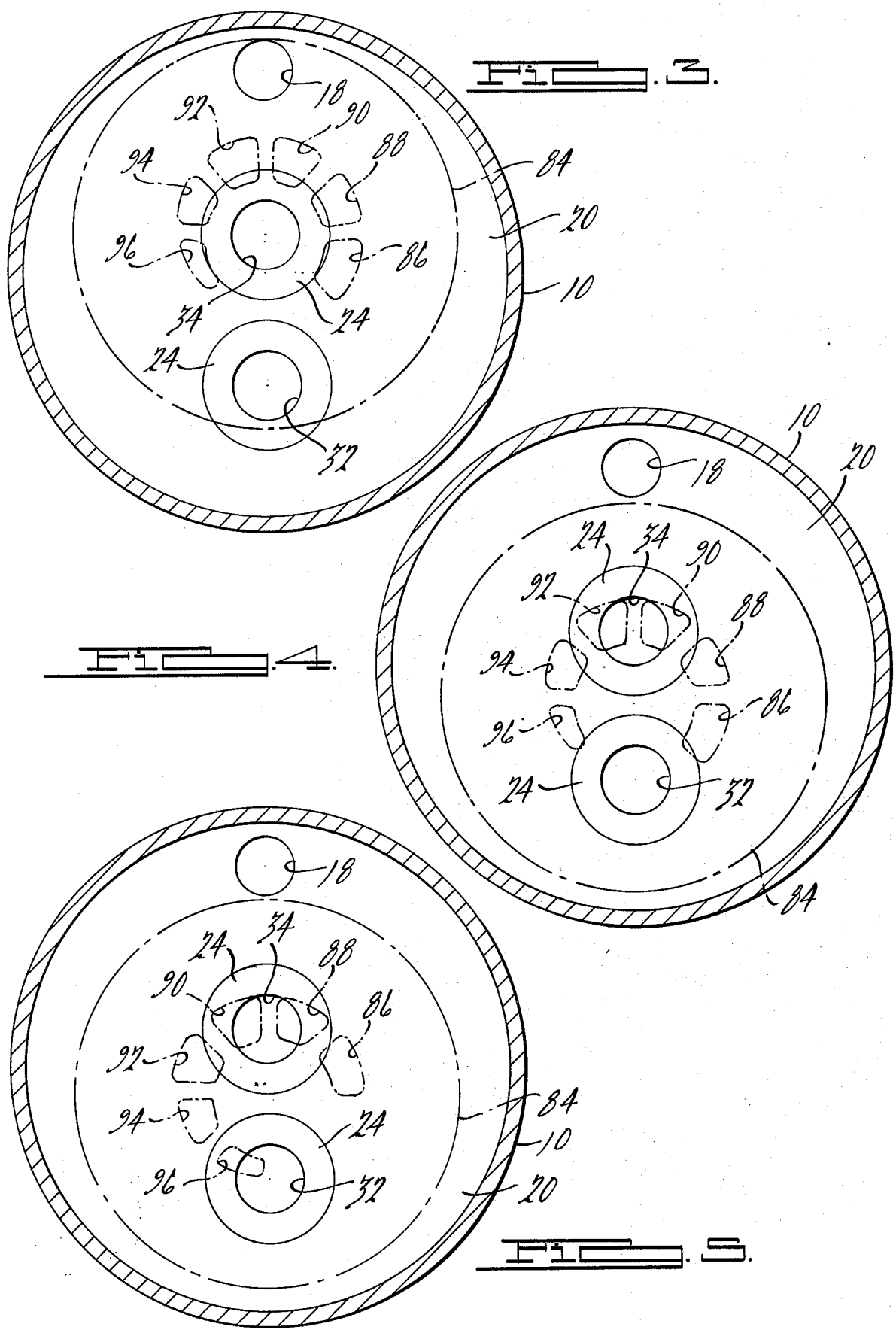

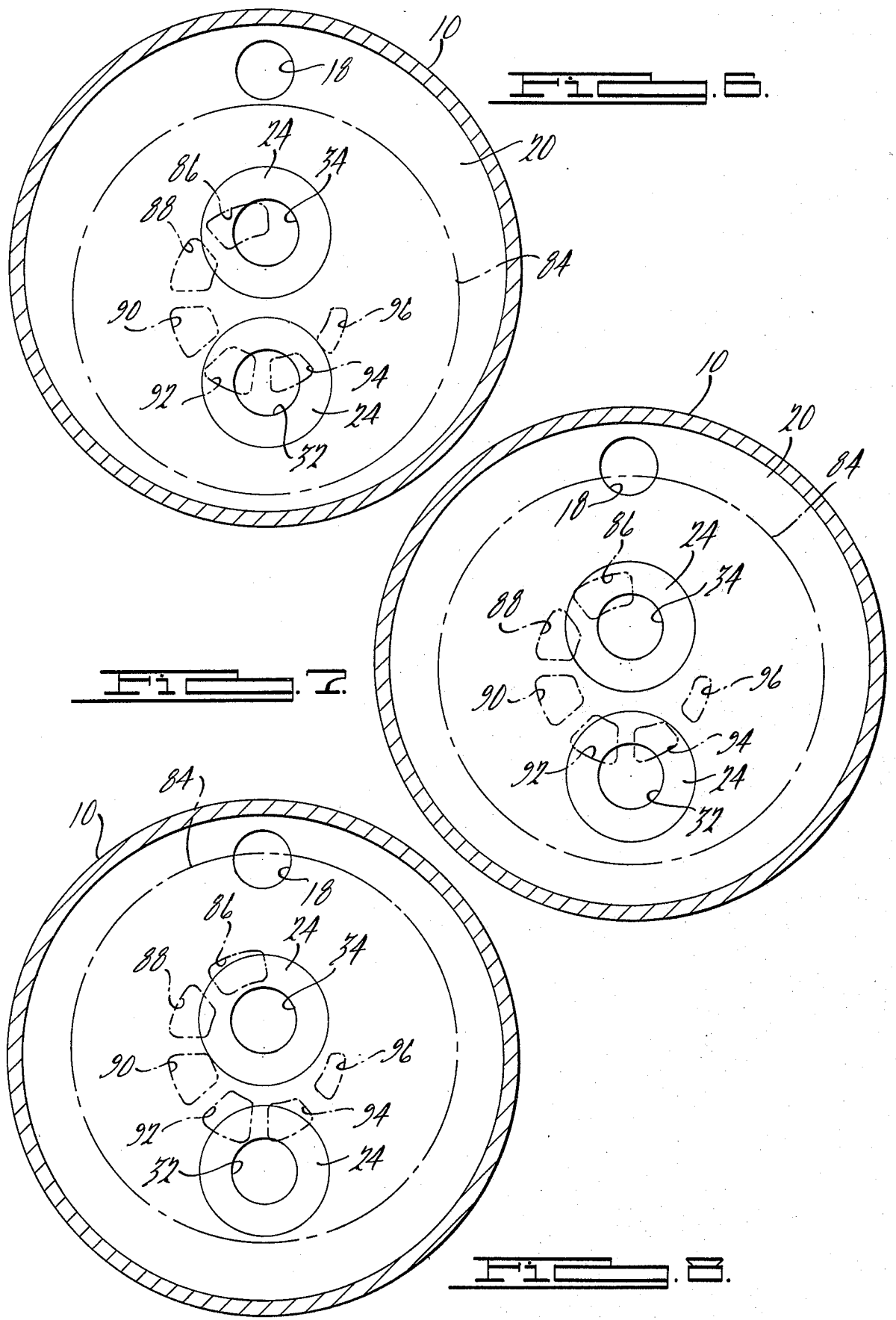

MIXING VALVE

The port configuration and mode of operation provided by this invention is capable of being employed in mixing valves of various types. For example, it may be employed in a mixing valve of the disc type shown in U.S. Pat. No. 3,384,119 or in a ball type mixing valve of the kind shown in U.S. Pat. Nos. 3,056,418 and 3,417,783. The prior art mixing valves are subject to the disadvantage that the extent of movement of the control handle through the comfort range of about 90° to 110°F. is relatively slight thereby making accurate temperature adjustment in this range quite difficult to obtain and also difficult to maintain when the valve is set at a given temperature and moved to vary the volume of flow. The present mixing valve is provided with a porting arrangement which allows the operating handle to be rotated through 180° to obtain a selected temperature adjustment, with nearly one half of such handle rotation taking place within the normal comfort range of temperature adjustment, and also permits installation of a pair of valves on opposite sides of a wall without requiring the need of any cross-over piping.

DESCRIPTION OF THE DRAWINGS

FIG. 1 is a sectional view through a disc type mixing valve embodying the present invention;

FIG. 2 is a sectional view taken on line 2—2 of FIG. 1;

FIG. 3 is a sectional view taken on line 3—3 of FIG. 2 and showing the valve in the off position;

FIG. 4 is a sectional view similar to FIG. 3 and showing the valve in the full cold position;

FIG. 5 is a view similar to FIG. 4 but showing the valve member rotated to provide a mixture of hot and cold water;

FIG. 6 is a view similar to FIG. 5 showing the valve member rotated further to provide a mixture of increased temperature;

FIG. 7 is a view similar to FIG. 6 but showing the valve member shifted to a position to provide a reduced volume of flow at the same temperature setting;

FIG. 8 is a view similar to FIG. 7 showing the valve member moved to the off position;

DESCRIPTION OF PREFERRED EMBODIMENTS

Figure 9:
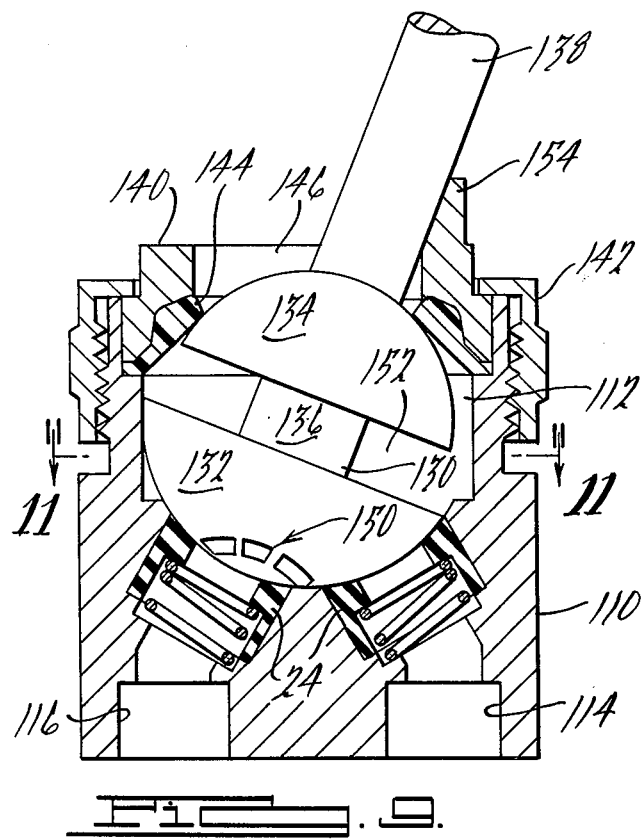
FIG. 9 is a vertical sectional view of a ball type mixing valve embodying the present invention.

In the embodiment of the invention shown in FIGS. 1 to 8, a valve body 10 is of generally cylindrical shape and is provided with a mixing chamber 12 opening from its upper end. The valve body 10 is provided with a cold water inlet 14, a hot water inlet 16 and a discharge port 18, all of which communicate with the mixing chamber 12 through the bottom wall 20 thereof. Valve seats 24 within the inlets 14 and 16 are urged upwardly by springs 26 to engage the bottom surface 28 of a disc valve member 30 to provide a seal therebetween. The openings 32 and 34 in the valve seats 24 respectively define the hot and cold water inlet ports which open into the mixing chamber 12.

A retaining member 36 is mounted in the upper end of the valve body 10 and has an outwardly directed flange 38 seated against the upper end of the valve body. The retaining member 36 has an annular groove containing an O-ring 39 to provide a seal between the retaining member and the valve body. The upper end of the valve body 10 is provided with a notch 40 and the flange 38 on the retaining member 36 has a lug 42 disposed within the notch 40 to provide a predetermined angular relationship between the valve body 10 and the retaining member 36.

The valve member 30 has flat upper and lower surfaces 43 and 44 which respectively engage the lower surface of the retaining member 36 and the bottom wall 20 of the valve body. The central portion 46 of the disc valve 30 is considerably reduced in cross section and has a recess 48 opening from its upper surface to receive the lower end 50 of a control member 52 which is supported by the retaining member 36. An O-ring 54 provides a seal between the retaining member 36 and the valve member 30.

The control member 52 includes a spherical portion 56 seated within a spherical recess 58 in the retaining member 36. The control member 52 further includes an upper semi-spherical portion 60 and a stem 62 projecting upwardly therefrom and adapted to have a handle member secured thereto in a conventional manner for operating the valve. A retaining cap 64 has an annular flange 66 seated against the flange 38 on the retaining member 36 and a collar 68 is threaded onto the upper end of the valve body 10 and has an inwardly directed flange 70 to clamp the retaining cap 64 against the retaining member 36. An annular gasket 72 is confined between the retaining cap 64 and the spherical portion 60 of the control member 52. The flange 38 on the retaining member 36 has a notch 74 and a projection 76 on the under side of the flange 70 of cap 64 is disposed within the notch 74 to obtain the correct angular relationship between the cap 64 and the valve body 10. The retaining cap 64 has a slot 78 therein through which the stem 62 projects. It will be seen that the control member 52 is mounted so that it may be rotated on a horizontal axis extending through the center of the lower spherical portion 56 thereof as the stem 62 is moved lengthwise through the slot 78 in the retaining cap 64 between the positions shown in FIG. 2. The control member 52 is also rotatable on its own axis in any adjusted position thereof.

The control member 52 is provided with a stem portion 79 which projects downwardly through a conical opening 80 in the lower retaining member 36 and into the recess 48 in the disc valve 30. The recess 48 in the disc valve receives the lower end 50 of the control member 52 and a pin 81 projects laterally from the end portion 50 and is disposed within a vertical slot 82 which intersects recess 48 in the valve member 30. The connection between the control member 52 and the valve member 30 is such that upon swinging movement of the control stem 62 through the slot 78 the valve member 30 will be shifted in a linear direction from left to right, or from right to left, as viewed in FIG. 2. When the stem 62 is rotated on its own axis in any adjusted position thereof the valve member 30 will be rotated on a vertical axis passing through the center of the ball portion 50 of the control member 52.

The lower disc portion 84 of the valve member 30 is provided with a series of ports therein arranged in a generally circular pattern around the central portion 46 of the valve member. FIGS. 3–8 inclusive illustrate various positions of the valve member 30 relative to the inlet ports 32 and 34 in the valve body. In these Figures the portion 84 of the valve member and the ports therein are shown in dash lines. The ports in the valve member 30 are shown as a series of separate ports 86, 88, 90, 92, 94 and 96 which are arranged in a generally circular pattern and extend through substantially in excess of 180° but less than 360° for a purpose to be described.

FIG. 3 illustrates the relationship of the ports 86-96 relative to the hot and cold water inlet ports 32 and 34 with the valve member in the off position. The off position is achieved by swinging the operating stem 62 to the left hand dotted line position thereof shown in FIG. 2 which causes movement of the valve member 30 to the right from the position shown in FIG. 2 so that there is no communication between any of the ports in the valve member and the inlet ports in the valve body. It is to be noted that in this position of the valve member the vertical axis of the valve member 30 coincides with the center of the cold water inlet port 34, and assuming that the operating handle has been rotated in a clockwise direction to the full cold position the ports in the valve member will be arranged relative to the cold water inlet port 34 as shown in FIG. 3. If the operating stem 62 is now swung all the way to the right as viewed in FIG. 2, which is the full open position of the valve, the valve member 30 will be moved to the position shown in FIG. 4 in which ports 90 and 92 communicate with the cold water inlet port 34 while the hot water inlet port 32 remains closed. When the operating stem 62 is rotated on its axis in a counterclockwise direction, the end port 96 in the valve member 30 will begin to communicate with the hot water inlet port 32 while ports 88 and 90 will communicate with port 34, as shown in FIG. 5, to provide a mixture of hot and cold water. Further rotation of the operating handle in a counterclockwise direction will successively bring the ports 94 and 92 in the valve member 30 into communication with the hot water inlet port 32, as shown in FIG. 6, and in which position the port 86 will communicate with the inlet port 34.

As shown in FIGS. 4 and 5, the extent of rotational movement of the valve stem 62 on its axis from the full cold position of FIG. 4 to the position of FIG. 5 is relatively small. After the stem has been rotated far enough to obtain a mixture of hot and cold water at approximately 90°F., which position may be slightly beyond that shown in FIG. 5, the stem can then be rotated through a very considerable angular extent such as about 85° as the extent of opening of the cold water inlet port 34 gradually decreases and the extent of opening of the hot water inlet port 32 gradually increases to provide a mixture of progressively increasing temperature throughout such extent of rotation of the stem 62. During such rotation of the stem 62 the temperature of the mixture will gradually increase to about 110° and continued rotation in a counterclockwise direction will then rapidly decrease the extent of opening of the cold water port 34 while increasing the extent of opening of the hot water port 32 until the full hot position is reached.

FIG. 6 illustrates an approximately equal mixture of hot and cold water supplied to the mixing chamber at maximum volume of flow. If the operating handle is then pulled back to reduce the volume of flow, the valve member 30 will be shifted to the position illustrated in FIG. 7. Due to the geometry of the series of ports in the valve member and their relationship to the hot and cold water inlet ports, movement of the valve member 30 to either increase or decrease the volume of flow from any selected position of rotation of the operating handle will vary the volume of flow without any significant change in the relative proportions of hot and cold water discharged into the mixing chamber. Similarly, the geometry and relationship of the ports is such that at any desired volume of flow the operating handle may be rotated to vary the temperature of the mixture without any significant change in the volume of flow.

As shown in FIGS. 1 and 2, the cap 64 has an upwardly extending stop 100. The stem 62 is provided at its upper end with a pair of flats 102 and 104 of different depths and is also provided with a tapped hole 106 to enable a handle (not shown) to be secured on the stem. The handle is provided with abutments engageable with the stop 100 to limit rotation of the stem 62 on its axis in either direction. The abutments on the handle are arranged relative to the stop 100 to permit 180° of rotation of the stem. This construction together with the porting arrangement described makes it possible to install two of the valves in back to back relation on a single wall without requiring any cross-over piping. In order to accomplish such installations, it is merely necessary to remove the handle from one of the valve stems and then rotate the stem through 180° and replace the handle.

The ports 86-96 in the valve member 30 have been shown as a series of individual ports of generally quadrangular shape. The length and width of the ports is varied, as shown in the drawings, and is selected to achieve the desired objective of gradually increasing the flow through one of the inlet ports in the valve body while gradually decreasing the flow of the other such ports as the handle is rotated through a very substantial angular extent. It will be apparent that in some applications it would be possible to use a single arcuate port in the valve member 30 rather than a series of separate ports as illustrated, although the use of a series of separate ports is advantageous when the valve body is provided with rubber valve seats 24 of the kind described.

Referring to FIG. 3, it is apparent that when the valve is in the off position the handle may be rotated through the full 180° without opening either of the inlet ports 32 or 34. Thus, the handle may be moved to the off position from any selected temperature adjustment and subsequent opening of the valve will return it to the same temperature adjustment.

Figure 11:
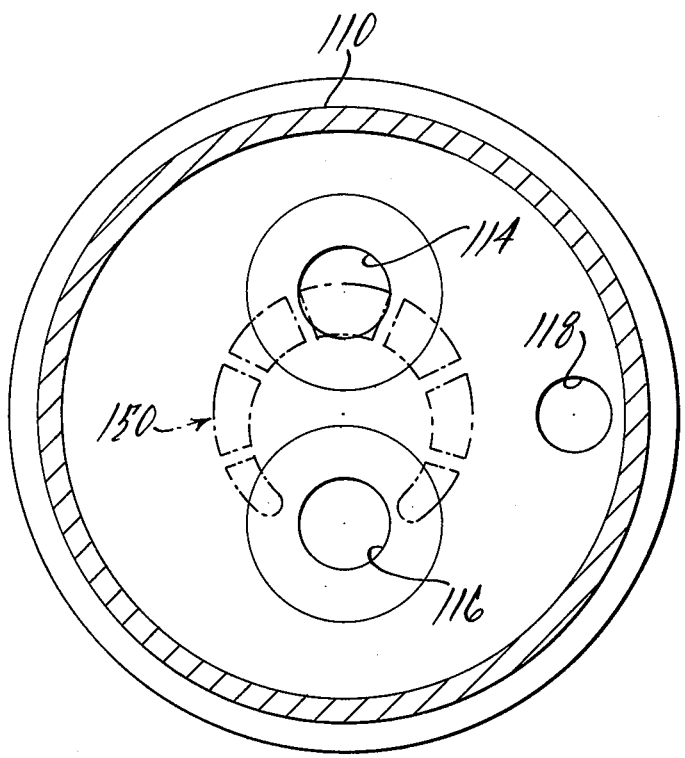
FIG. 11 is a horizontal sectional view taken on line 11—11 of FIG. 9.
Figure 10:
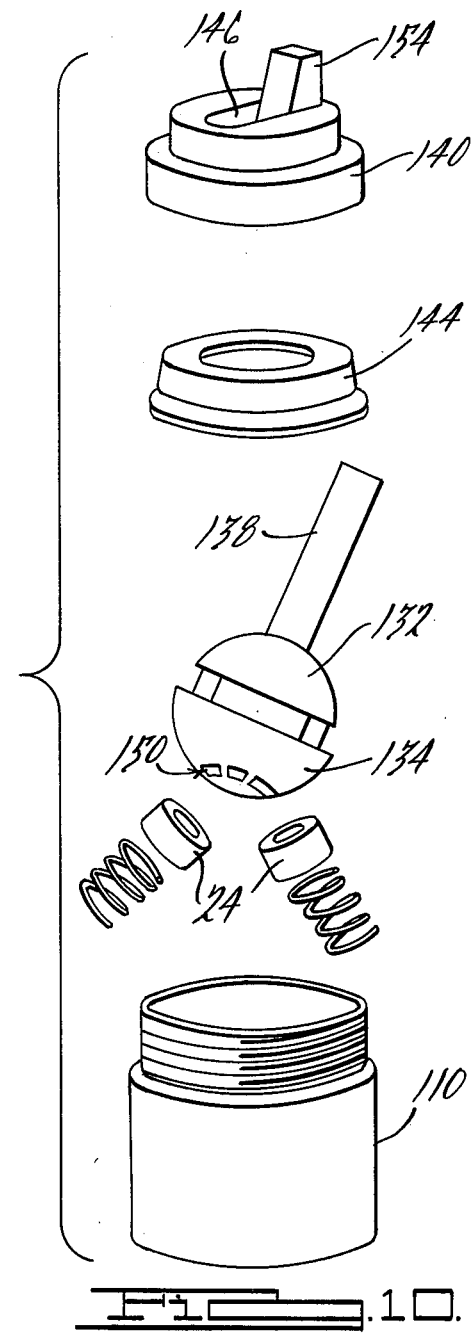
FIG. 10 is an exploded perspective view of the parts of the valve shown in FIG. 9.

FIGS. 9, 10 and 11 illustrate a ball type mixing valve embodying the present invention. In this form of the invention the valve body 110 is provided with a mixing chamber 112, a cold water inlet port 114, a hot water inlet port 116, and a discharge port 118. The valve member 130 is in the form of two semi-spherical portions 132 and 134 connected by a stem portion 136 which is extended upwardly, as at 138, to receive a handle (not shown) for manipulation of the valve member. As in the previously described embodiment, a retaining cap 140 is engaged by a collar 142 to confine the ball portions 132 and 134 between the bottom wall of the mixing chamber 112, which in this embodiment is a spherical socket, and the gasket 144. The ball portions 132 and 134 although formed on a different radius have the same center of curvature. The operating stem 138 may be swung from right to left, as viewed in FIG. 9, through a slot 146 in the cap 140 and may be rotated on its own axis in any adjusted position within the slot 146.

The lower ball portion 132 is provided with a series of ports, indicated generally at 150, which are arranged in a generally circular pattern, as shown in FIG. 11. The ports 150 extend through the ball portion 132 and open into the space 152 between the ball portions 132 and 134 to discharge water from the inlet ports 114 and 116 into the mixing chamber 112 for discharge through the outlet port 118.

The configuration of the series of ports 150 in the valve member 130 and their relationship to the inlet ports 114 and 116 is essentially the same in the embodiment of the invention shown in FIGS. 9–11 as previously described. The cap 140 is also provided with a stop 154 cooperable with abutments on the handle to limit rotation of the stem 138 to 180° and as in the previously described modification, the handle may be removed and the stem rotated 180° and the handle then replaced to achieve back to back installation of a pair of valves from a single set of supply lines.

A further important feature of the present invention is that the opening and closing movement of the valve member that is obtained by swinging the operating stem through the slot in the retaining cap shifts the valve member in a direction parallel to or along a line which joins the centers of the hot and cold water inlet ports, as reference to FIGS. 3, 4 and 11 will show. This feature of the invention makes it possible to use a port configuration in the valve member having a substantial angular extent as described herein and thus to achieve the objective of very gradual temperature change through a wide angle of rotation of the operating handle in the comfort range. The porting arrangement described herein is capable of achieving the described advantages without any significant increase in the over all size of the valve as compared with prior mixing valves of this type.

What we claim as our invention is:

1. A hot and cold water mixing valve comprising a valve body having a mixing chamber therein, one wall of which has a hot water inlet port and a cold water inlet port therein, an outlet port opening from said mixing chamber, a valve member in said mixing chamber having a surface thereof seated against said one wall of said mixing chamber, porting means in said valve member to communicate said inlet ports with said outlet ports, said porting means in said valve member extending over said surface in a generally circular pattern extending through substantially in excess of 180° but less than 360°, operating means for said valve member including a handle projecting outwardly from said valve body and mechanical interconnecting means between said handle and said valve member causing linear movement of said valve member in the direction of a line joining the centers of said inlet ports in response to rotation of said handle about a first axis of rotation and causing rotation of said valve member on an axis normal to said surface and passing through the center of said circular porting means in response to rotation of said handle about a second axis of rotation, said valve member being movable by said handle and interconnecting means in said linear direction between a closed position in which said axis of rotation of said valve member is aligned with one of said inlet ports whereby both of said inlet ports remain closed by said valve member in any rotational position of said valve member, and an open position in which said porting means intersects either one or both of said inlet ports, depending upon the rotational position of said valve member, rotation of said valve member on its axis of rotation when in said open position varying the extent of opening of said inlet ports to regulate the temperature of the mixture discharged through said outlet port.

2. A mixing valve according to claim 1, including means limiting rotation of said handle on said second axis to about 180°.

3. A mixing valve according to claim 2, wherein said valve member, in one limit position of said handle about said second axis, is capable of opening only said cold water inlet port, and in the other limit position of said handle about said second axis is capable of opening only said hot water inlet port.

4. A mixing valve according to claim 3, wherein said porting means in said valve member is so arranged and dimensioned relative to said inlet ports as to provide a gradual increase in the temperature of the mixture from about 90° to about 110°F. as said handle is rotated through about 80° to 85° on said second axis of rotation.

5. A hot and cold water mixing valve comprising a valve body having a mixing chamber therein, one wall of which has a hot water inlet port and a cold water inlet port therein, an outlet port opening from said mixing chamber, a valve member in said mixing chamber having a surface thereof seated against said one wall of said mixing chamber, said valve member being ported to communicate said inlet ports with said outlet port, the porting in said valve member being arranged in a generally circular pattern extending through at least 180°, operating means for said valve member including a handle projecting outwardly from said valve body and means interconnecting said handle and said valve member, said handle being rotatable about one axis of rotation to produce linear movement of said valve member in the direction of a line joining the centers of said inlet ports and being rotatable about a second axis of rotation to produce rotation of said valve member on an axis normal to said surface and passing through the center of said circular porting pattern, said valve member being movable by said handle and interconnecting means in said linear direction between a closed position in which its axis of rotation is aligned with said cold water inlet port whereby both of said inlet ports remain closed in any rotational position of said valve member, and an open position in which rotation of said valve member causes said porting pattern to intersect both of said inlet ports, rotation of said valve member on its axis when in said open position gradually increasing the extent of opening of one of said inlet ports while proportionately decreasing the extent of opening of the other inlet port thereby to regulate the temperature of the mixture discharged through said outlet port.

6. A mixing valve according to claim 5, including means limiting rotation of said handle on said second axis to about 180°.

7. A mixing valve according to claim 6, wherein said valve member, in one limit position of said handle on said second axis, is capable of opening only said cold water inlet port, and in the other limit position of said handle on said second axis is capable of opening only said hot water inlet port.

8. A mixing valve according to claim 7, wherein said porting pattern in said valve member is so arranged and dimensioned relative to said inlet ports as to provide a gradual increase in the temperature of the mixture from about 90° to about 110°F. as said handle is rotated through about 80° to 85° on said second axis of rotation.

9. A hot and cold water mixing valve comprising a valve body having a mixing chamber therein, one wall of which has a hot water inlet port and a cold water inlet port therein, and an outlet port opening from said mixing chamber, a valve member in said mixing chamber having a surface thereon seated against said one wall of said mixing chamber, operating means for said valve member including an operating handle disposed outwardly of said valve body and means interconnecting said handle and said valve member, said handle being rotatable about its axis to produce rotation of said valve member against said one wall of said mixing chamber, said handle being rotatable about a second axis which is perpendicular to a line joining the centers of said inlet ports to produce movement of said valve member in a manner to shift the axis of rotation of said valve member in the direction of said line joining the centers of said inlet ports, said valve member being ported to communicate said inlet ports with said outlet port, the porting in said valve member being arranged in a generally circular pattern extending through substantially in excess of 180° but less than 360° around the axis of rotation of said valve member and being arranged and dimensioned so that movement of said handle about said second axis in one direction moves said valve member to a position in which both of said inlet ports are closed irrespective of the extent of rotation of said handle on its axis in either direction, and so that movement of said handle about said second axis in the opposite direction moves said valve member to progressively increase the volume of flow through either or both of said inlet ports, the proportions of hot and cold water discharged through said inlet ports being selectively determined by rotation of said handle on its axis.

10. A mixing valve according to claim 9, including means limiting said handle to about 180° of rotation on its axis.

11. A mixing valve according to claim 10, wherein said porting in said valve member is so arranged and dimensioned relative to said inlet ports as to provide a gradual increase in the temperature of the mixture from about 90° to 110° F. as said handle is rotated through about 80° to 85° on its axis.

12. A hot and cold water mixing valve comprising a valve body having a mixing chamber therein, one wall of which has a hot water inlet port and a cold water inlet port therein, an outlet port opening from said mixing chamber, a valve member in said mixing chamber having a surface thereof seated against said one wall of said mixing chamber, said valve member being ported to communicate said inlet ports with said outlet port, and operating means for said valve member including a handle projecting outwardly from said valve body and means interconnecting said handle and said valve member, characterized by the fact that:
   a. said porting in said valve member is arranged in a generally circular pattern extending through in excess of 180° but less than 360°, and
   b. said handle and said interconnecting means are selectively operable to
      1. rotate said valve member on an axis passing through said valve member within said porting pattern, and
      2. move said valve member in a manner to shift the axis of rotation of said valve member along a line joining the centers of said inlet ports between a closed position in which said axis of rotation passes through one of said inlet ports and said porting pattern extends around said one inlet port, and an open position in which said axis of rotation is between said inlet ports and said porting pattern intersects both of said inlet ports.

13. A mixing valve according to claim 12, wherein said handle is rotatable about two different axes to produce said rotation and said movement of the axis of rotation of said valve member.

14. A mixing valve according to claim 13, wherein said handle is rotatable through about 180° on one of said axes to rotate said valve member on its axis.

15. A mixing valve according to claim 14, wherein said porting pattern communicates with both of said inlet ports through at least about 80° of rotation of said handle on said one axis.

16. A mixing valve according to claim 12, including stop means permitting installation of said valve member in said valve body in either of two angular positions displaced 180° from each other.

17. A hot and cold water mixing valve comprising a valve body having a mixing chamber therein, one wall of which has a hot water inlet port and a cold water inlet port therein, an outlet port opening from said mixing chamber, a valve member in said mixing chamber having a surface thereof seated against said one wall, porting means in said valve member to communicate said inlet ports with said outlet port, said porting means in said valve member extending over said surface in a generally circular arc in excess of 180° but less than 360°, valve operating means operably secured to said valve member and including an elongate handle projecting outwardly from said valve body, said operating means being secured to said valve member by mechanical interconnecting means causing movement of said porting means in the direction of a line on said one wall joining the centers of said inlet ports in response to rotation of said handle about a first axis of rotation to bring said porting means into and out of registry with said inlet ports by relative movement of said inlet ports laterally across said arc and causing rotational movement of said valve member in response to rotation of said handle about a second axis of rotation to bring said porting means into and out of registry with said inlet ports by relative movement of said inlet ports in a curved path along said arc.

18. The valve of claim 17, wherein said second axis of rotation of said handle is the longitudinal axis of said handle and lies normal to said first rotational axis.

19. A hot and cold water mixing valve comprising a valve body having a mixing chamber therein, one wall of which has a hot water inlet port and a cold water inlet port therein, an outlet port opening from said mixing chamber, a valve member in said mixing chamber having a surface thereof seated against said one wall of said mixing chamber, said valve member being ported to communicate said inlet ports with said outlet port, and operating means for said valve member including a handle projecting outwardly from said valve body and means interconnecting said handle and said valve member, characterized by the fact that:
a. said porting in said valve member is arranged in a generally circular pattern extending through in excess of 180° but less than 360°, and
b. said handle and said interconnecting means are selectively operable to
1. rotate said valve member on an axis passing through said valve member within said porting pattern, and
2. move said valve member in a manner to shift the axis of rotation of said valve member along a line joining the centers of said inlet ports between a closed position in which said porting pattern is out of registry with both of said inlet ports, and an open position in which said porting pattern intersects either one or both of said inlet ports.

* * * * *